United States Patent [19]

Saderholm et al.

[11] Patent Number: 5,501,484
[45] Date of Patent: Mar. 26, 1996

[54] RIVETLESS CUSHION RETAINING RING WITH TABS WHICH LOCK THE RING IN PLACE AFTER ROTATION

[75] Inventors: Davin G. Saderholm, Salt Lake City; Kirk Rasmussen, West Point; Brian M. Shaklik, Bountiful, all of Utah

[73] Assignee: Morton International, Inc., Chicago, Ill.

[21] Appl. No.: 379,412

[22] Filed: Mar. 20, 1995

[51] Int. Cl.⁶ .................................................. B60R 21/20
[52] U.S. Cl. .......................................... 280/728.2; 403/348
[58] Field of Search .......................... 280/728.2, 731, 280/732, 730.1, 743.1, 728.1; 403/348, 349, 350

[56] References Cited

U.S. PATENT DOCUMENTS

| | | | |
|---|---|---|---|
| 2,873,131 | 2/1959 | Metrailer | 403/348 |
| 3,009,719 | 11/1961 | Otto et al. | 403/348 |
| 4,988,119 | 1/1991 | Hartmeyer | 280/728.2 |
| 5,064,218 | 11/1991 | Hartmeyer | 280/728.2 |
| 5,096,222 | 3/1992 | Komerska et al. | 280/728.2 |
| 5,141,247 | 8/1992 | Barth | 280/728.2 |
| 5,176,400 | 1/1993 | McGuire et al. | 280/728.2 |
| 5,193,846 | 3/1993 | Allard | 280/728.2 |
| 5,259,641 | 11/1993 | Schenk et al. | 280/728.2 |
| 5,320,379 | 6/1994 | Burnard et al. | 280/728.2 |
| 5,368,327 | 11/1994 | Shiraki et al. | 280/728.2 |

FOREIGN PATENT DOCUMENTS

| | | | |
|---|---|---|---|
| 0542418 | 5/1993 | European Pat. Off. | 280/728.2 |
| 1467964 | 2/1967 | France | 403/348 |
| 2250243 | 3/1992 | United Kingdom | 280/728.2 |
| 2250483 | 10/1992 | United Kingdom | 280/728.2 |

Primary Examiner—Margaret A. Focarino
Assistant Examiner—Peter C. English
Attorney, Agent, or Firm—Charles N. Lovell; Gerald K. White

[57] ABSTRACT

This invention relates to a clamping structure for assembling an automotive air bag to an automotive air bag inflator. The clamping structure includes an annular retainer ring and module housing. Integral "L" shaped tabs or studs descending from the annular retainer are designed to pass through radial slots in the air bag and module housing. The tab or stud is formed to have an "L" shape with the short leg of the "L" having a slight angle. Then as the retainer is rotated into place, the short leg of the "L" shaped tab or stud will be forced into contact with the housing and clamp the assembly together.

6 Claims, 4 Drawing Sheets

RIVETLESS CUSHION RETAINING RING WITH TABS WHICH LOCK THE RING IN PLACE AFTER ROTATION

BACKGROUND OF THE INVENTION

The present invention relates to an improved air bag mounting system. More specifically the invention is directed to an arrangement for retaining a preassembled state among the various components of an air bag module to insure the integrity of such subassembly during final assembly operations. Among the components of the air bag module are the cover, air bag cushion, air bag clamping means (annular retainer, module housing and fasteners), gas generator or inflator, ignition element and a means to attach the assembly to the body of the automobile.

The inflator, due to the presence of the gas generant, a pyrotechnic, is the most sensitive component. Accordingly, for safety reasons it is desirable to delay installation of the inflator to as late as possible in the assembly process. Thus, the housing, air bag cushion and annular retainer are usually preassembled as a subassembly before installation of the inflator. It is important that the aforementioned three components of the air bag subassembly be firmly held together so that they will not become dislodged prior to final assembly.

In a conventional mounting for an air bag, the peripheral region around the outer circumference of the gas inlet opening into the air bag is clamped between a module housing provided around the gas discharge or exit opening and an annular retainer secured to the module housing. The module housing is mounted to the vehicle body, for example, the steering wheel. The annular retainer is bolted or riveted to the module housing.

Both riveting and bolting add another step in the manufacturing process, which serve to delay production by increasing the time required to produce an air bag subassembly. Further, workman sometimes spend an inordinate amount of time trying to line up the corresponding holes for insertion of the bolts and/or rivets.

The use of rivets is also a major cause of reworking of the inflator module assembly due to the necessity of replacing broken or unfastened rivets. Reworking of the inflator is not always possible. Riveting sometimes poses the danger of damaging the air bag during the handling and riveting operations thereby compromising the structural integrity of the air bag module. In these situations the defective modules must be discarded, resulting in lost production and increased cost. The elimination of rivets in the manufacture of the air bag module assembly obviates a major cause for reworking and/or discarding of defective air bag modules.

Air bag deployment in the event of a collision takes place in a time period of approximately one-twentieth of a second and the large forces produced thereby tend to pull the clamped portion of the bag from the module housing. Therefore, it is important that the retaining ring be able to firmly hold the air bag in place so as to prevent a large amount of blow-by of the inflating gas into the passenger compartment of the vehicle. Currently gases from the inflator escape into the passenger compartment through discrete vents by design. A small amount of blow-by would not add a large amount of gas to the passenger compartment. Blow-by is typically undesirable due to the effect it has on module components and air bag cushion fill.

One solution to provide clamping of the air bag and to increase the shear strength of the air bag between the fastener and the inner edge of the gas inlet opening is to dispose a plurality of slotted studs perpendicularly away from the axial face of the retainer ring as disclosed by Hartmeyer, U.S. Pat. No. 4,988,119. The slotted studs have enlarged heads which deflect due to the central slot when passed through an aperture in the air bag and base plate and expand once through the aperture to engage the material surrounding the aperture. Rivets are then disposed through the studs to further engage the base plate.

Another solution is described in U.S. Pat. No. 5,176,400 to McGuire et al, wherein an annular retainer ring is provided with projecting pins which form a frictioned interference fit with apertures in the module housing. The projecting pins are forced into the apertures forming a frictioned interference fit capable of holding the air bag subassembly together. In another embodiment the projecting pins are "peened over" to form a clamping action. Another prior art construction is disclosed in U.S. Pat. No. 5,141,247 to Barth which describes a retainer ring having tabs which are bendable into position for exerting clamping forces on the air bag, inflator and support plate.

Co-pending application Ser. No. 08/048,567 filed Apr. 15, 1993 and assigned to the assignee of the present invention discloses a similar annular retainer ring comprising axial descending tab means. The tabs after passing through apertures in the air bag cushion and module housing can be bent or deformed so as to engage the underside of the module housing thus clamping the air bag cushion to the housing.

SUMMARY OF THE INVENTION

An object of this invention is to provide a means of clamping an air bag during assembly of an air bag module (air bag, inflator, mounting bracket, and cosmetic cover) without permanently securing the fastener means.

Another object of this invention is to provide an automotive air bag safety restraint module the component parts of which are so arranged as to allow the installation of the inflator at the final step in the assembly of the air bag module.

Another object of this invention is to eliminate the need for rivets to attach the air bag to the annular retainer.

These and other objectives of the invention, which will become apparent from the following description, have been achieved by a novel clamping device for holding an air bag onto a matching inflator. The air bag is clamped around the periphery of the gas inlet opening of the air bag by a clamping device which includes an annular retainer or retainer ring and a module housing.

The annular retainer or retainer ring has an inner boundary, a body with a top and bottom, an outer boundary, and a plurality of first holes passing through the annular retainer. A plurality of axial descending tab or stud members project from the bottom of the annular retainer. These members comprise "L" shaped tabs or studs with the short leg of the "L" being bent at a slight angle. All of the tabs or studs do not have to have this feature, some are straight. Optionally, walls substantially perpendicular to the body of the ring are attached to the top of the annular ring at its inner and outer boundaries. The clamping device also includes a module housing having a mounting edge, body with a top and bottom, and a inner boundary defining a central opening matching the shape of the inflator with a plurality of second and third holes passing through the body of the module housing radially outward of the central opening. The third holes are positioned to receive the axial descending members from the annular retainer when the annular retainer is brought into proper relation to the module housing.

The air bag which is to be held to the inflator housing has a gas inlet opening in the central region thereof which conforms to the shape of the inflator, a plurality of fourth holes radially outward of the gas inlet opening to accommodate the fastener means, and a plurality of fifth holes radially outward of the gas inlet opening to accommodate the tab or stud members of the annular retainer. Fastener means are passed through the first, fourth and second holes to join the retainer ring, air bag, and module housing respectively.

The clamping device, with the combination of axial clamping, fasteners, and "L" shaped members holds the air bag onto the inflator during deployment. During assembly of the air bag module the air bag is held in place by the "L" shaped tabs or studs without otherwise securing the fastener means. To secure the air bag during assembly of the air bag module, a plurality of "L" shaped tabs or studs are used as the axial descending members. The tabs or studs are provided with an "L" shape, but with the short leg of the "L" bent over at a slight angle. Then as the retaining ring is rotated into place, the short leg of the "L" will engage the housing and clamp the sub-assembly together. The aforesaid angle of the tab or stud provides a lead in for the tab or stud and allows pressure to be put into the clamping system to keep the sub-assembly together without otherwise securing the fastener means. Thus, the ring clamps the housing, cushion and cushion retaining ring in place until the nuts are put on the fasteners and torqued.

The various features of novelty that characterize the invention are pointed out with particularity in the claims that are annexed to and form a part of this specification. For a better understanding of the invention, its operating advantages, and specific objects attained by its use, reference is made to the accompanying drawings and descriptive matter in which a preferred embodiment of the invention is illustrated.

BRIEF DESCRIPTION OF THE DRAWINGS

With this description of the invention, a detailed description follows with reference being made to the accompanying figures of drawing which form part of the specification, in which like parts are designated by the same reference numbers, and of which.

DETAILED DESCRIPTION OF THE PREFERRED EMBODIMENT

Figure 1:
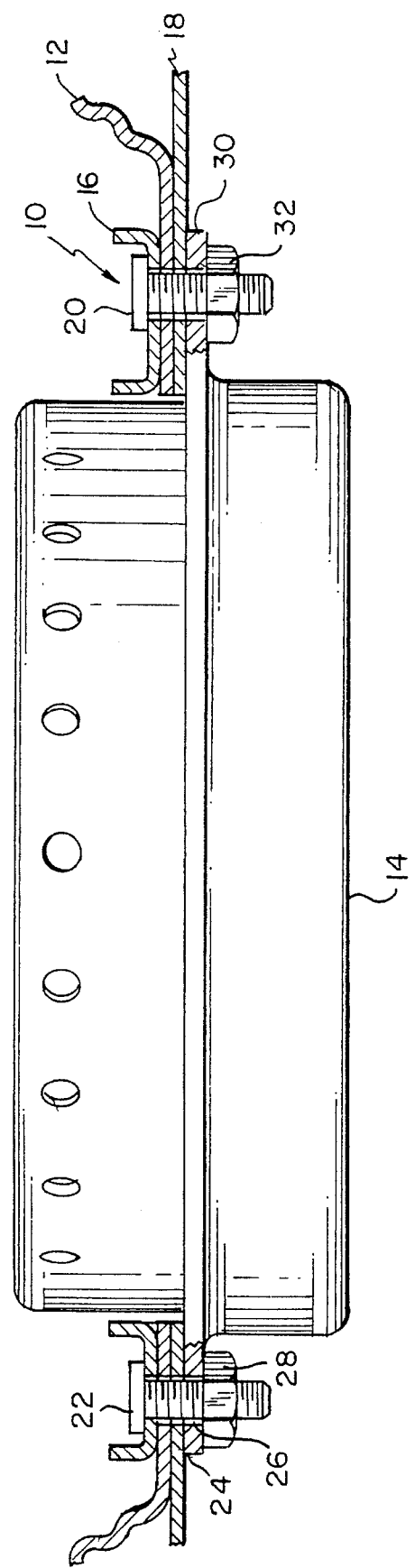
FIG. 1 is a cross-sectional view of the clamping assembly and illustrates the clamping of the air-bag by the annular retainer and the module housing and the attachment of the inflator.

As best seen in FIG. 1, a clamping device shown generally at 10 for clamping an air bag 12 to an inflator 14, comprises an annular retainer or retainer ring 16 and a module housing 18. A fastener means 20 passes through an annular retainer fastener opening or hole 22 (hereinafter termed first hole), air bag fastener opening or hole 24, a module housing fastener opening or hole 26 (hereinafter termed second hole), and an opening or hole 28 in a flange 30 provided on inflator 14, terminating with a nut 32 or the like.

Figure 2:
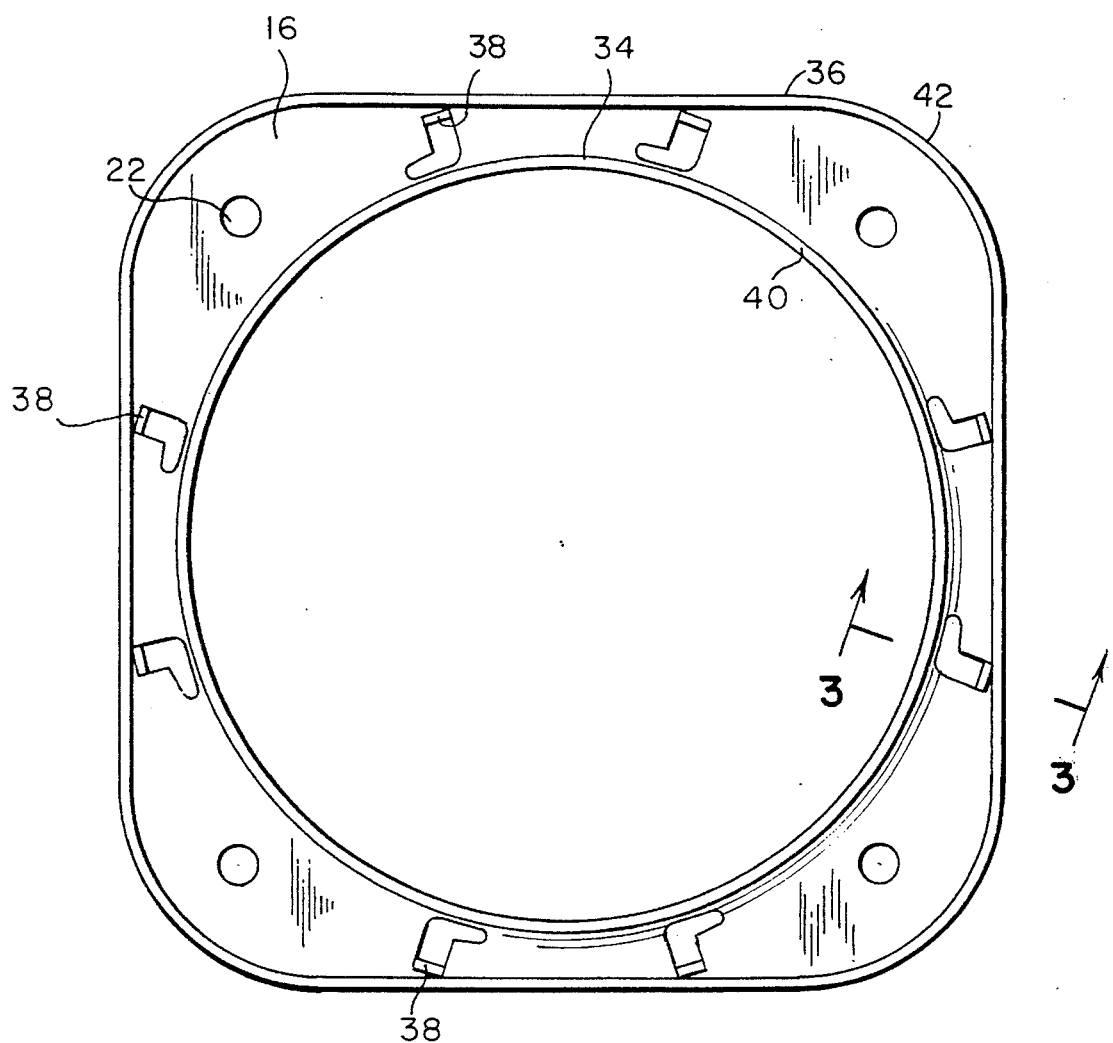
FIG. 2 is a top plan view of the annular retainer illustrating the fastener holes and tabs.

The annular retainer 16, as best seen in FIG. 2, has an inner boundary 34 which defines an opening conforming to that of the inflator 14 and a generally rectangular exterior boundary 36, a plurality of first holes 22 passing through the body of the annular retainer, and a plurality of axially descending members 38 (hereinafter termed tabs or studs) attached to the bottom of the annular retainer 16. Optionally, walls can be attached at the inner boundary 34 and outer boundary 36, with both walls 40 and 42 being disposed substantially perpendicular to the base of the retainer ring 16. The retainer ring 16 can be made out of any structurally suitable material such as plastic or metal, with metals such as aluminum or steel being preferred for strength, and with steel being most preferred for high strength and rigidity. The retainer ring can be manufactured by welding tabs or studs 38 and the optional walls 40 and 42 to the base, the annular retainer 16 with axial descending members 38 can be cast from one piece of metal, or preferably by stamping and forming the retainer ring 16 out of a single piece of metal to produce a stronger retainer ring 16 using less metal. The stamped retainer has the further advantage of being a low cost efficient means of manufacture.

Figure 4:
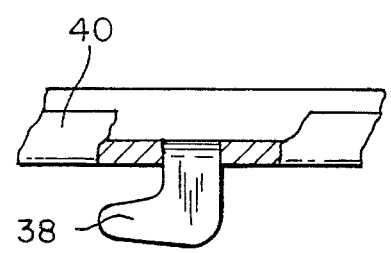
FIG. 4 is a cross-sectional view of the "L" shaped tab or stud of FIG. 2.

The axial descending member 38, in its preferred embodiment, as best seen in FIG. 4, is a tab 38 with a first leg and a second short or bent leg, with the center of the first leg being perpendicular to axial radii of the annular retainer. The tab 38 can be stamped and formed out of the same material as the ring, thus reducing manufacturing and material cost. The tab or stud will be in an "L" shape with the short leg of the "L" being bent at an angle. The tab can then be inserted through member holes in the air bag 12 (hereinafter fifth holes 44 FIG. 8) and module housing 18 (hereinafter third holes 46 FIG. 9) and then the retainer ring can be rotated to engage the bottom of the module housing 18. The angle formed by the short leg will provide a lead in for the tab or stud and will allow pressure to be put into the clamping system sufficient to hold the sub-assembly together. Thus the bag is held firmly between the annular retainer 16 and the module housing 18 during assembly of the remainder of the module assembly without the need for further closure means such as a nut 32 or the like and without installation of the inflator.

Figure 5:
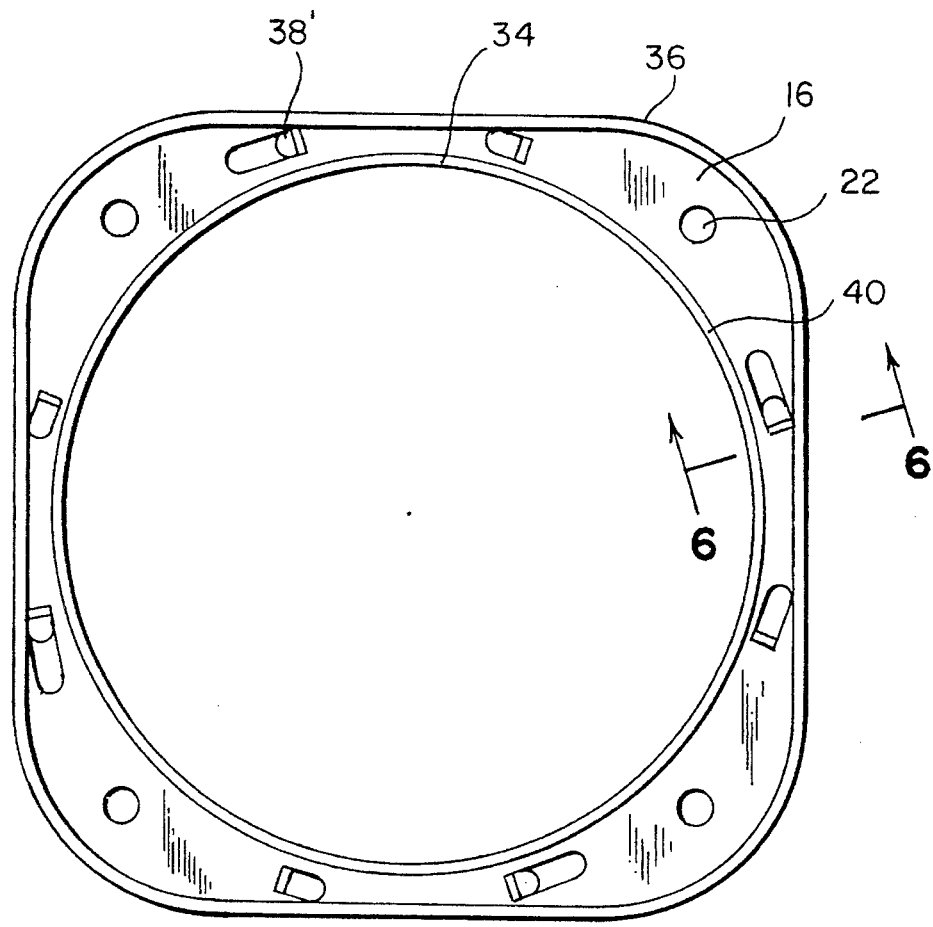
FIG. 5 is a top plan view of another form of the annular retainer illustrating the fastener holes and tabs or studs.
Figure 6:
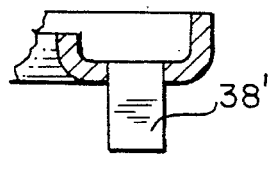
FIG. 6 is a fragmented cross-sectional view of the annular retainer, taken along line A—A of FIG. 5.
Figure 7:
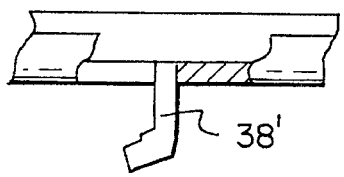
FIG. 7 is a cross-sectional view of the "L" shaped tab or stud of FIG. 5.

While FIG. 2 shows all the tabs being in an "L" shape, all of the tabs or studs do not have to have such "L" shape in order for adequate clamping to take place. FIG. 5 shows an embodiment of the invention where only four of the eight tabs or studs have the "L" clamping feature and four of the tabs are axial (straight) in shape. FIGS. 6 and 7 show the details of the "L" shaped tabs or studs.

Figure 3:
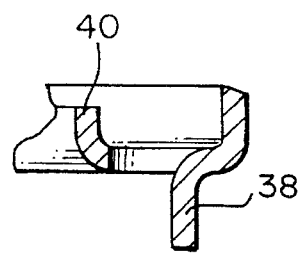
FIG. 3 is a fragmented cross-sectional view of the annular retainer, taken along line AA of FIG. 2, illustrating the tab.

Stamping the "L" shaped tab or stud out of the retainer ring and then bending it up allows the air bag cushion to bear on the width of the tab or stud. In high inflator performance applications, this would keep the cushion attached better by not allowing the tab or stud to tear through the attach points of the cushion. FIGS. 6 and 7 show the details of the stamped "L" tab. The embodiment of FIGS. 3 and 4 has been found to be better for high inflator performance while the embodiment of FIGS. 6 and 7 has been found to be better for low inflator performance applications.

The corresponding holes in the module housing for receiving the "L" shaped tabs or studs are in the form of radial slots in the area where the tabs or studs come through the housing. These slots allow the retainer ring to be rotated slightly and move into the clamping position. The retainer ring is put in the cushion as is currently the practice, the tabs would then be put through the radial holes/radial slots in the housing, and then the housing or retainer ring would be turned to lock the sub-assembly in place.

Figure 8:
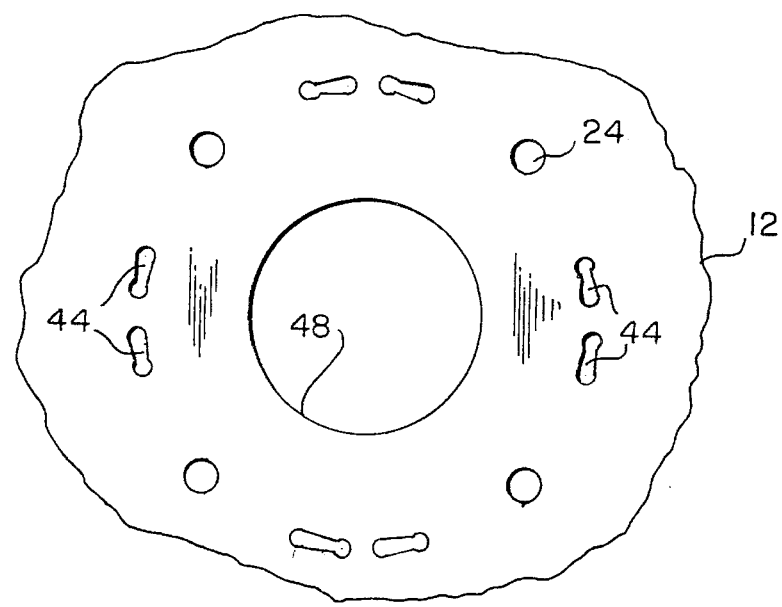
FIG. 8 is a top plan view of the air bag cushion illustrating the central opening holes for the axial descending members and fasteners.

As best seen in FIG. 8, the air bag 12 has a gas inlet opening which conforms to the general shape of the inflator 14 in a generally central region thereof defined by gas inlet opening boundary 48. Radially outward of the gas inlet opening boundary 48 are fastener openings 24 or fourth holes and fifth holes 44 to accommodate the axial descending members 38 of the annular retainer 16. The area of the air bag 12 radially outward of the gas inlet opening boundary 48 is clamped between retainer ring 16 and module housing 18 by axial clamping.

Figure 9:
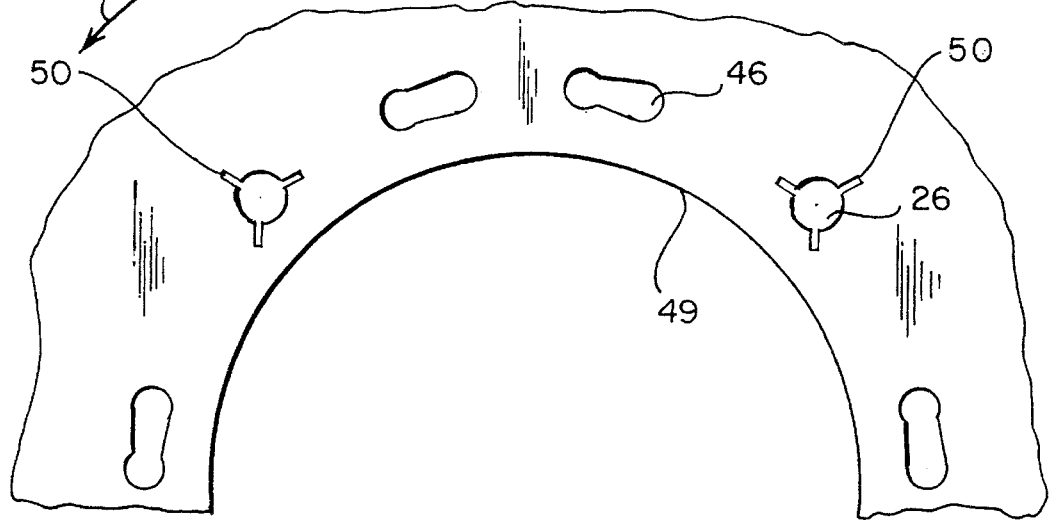
FIG. 9 is a partial top plan view of the module housing illustrating the fastener holes, and the slots for the axial descending members.
Figure 10:
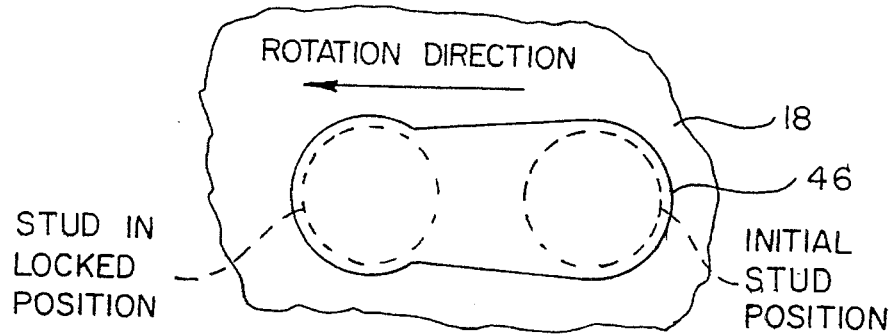
FIG. 10 is a cut-out of the top plan view of FIG. 9 showing the slot in detail.

The module housing 18, as best seen in FIG. 9, has an inner boundary 49 which defines a module opening conforming to that of the inflator 14, a plurality of second holes 26 passing through the module housing 18, a plurality of third radial holes/radial slots 46, and a mounting edge (not shown). The third holes/radial slots 46 are positioned to receive tab or stud members 38 when the annular retainer 16 is brought into proper relation thereto. These locking slots will be radial along the inflator flange centerline as illustrated in FIG. 9. The locking slots will be of a length necessary to install the retaining ring and rotate until the ring's locking tabs or studs are in place. The locking slots are designed so that as the retaining ring is rotating, the tabs or studs in the ring are being pressed by the slots until the tabs or studs snap into their final position, as illustrated in FIG. 10. Once in the final position, they will not be able to rotate back out because of the tapered shape of the groove. After the ring is in place in the housing, the locking grooves will prevent the housing ring cushion assembly from coming apart during the assembly of the module on the production line. The locking slots will also prevent the rotation of the inflator during deployment if any of the locknuts on the fasteners loosens. The size of the radial slots of course will be dependent on the size of the retaining ring tabs and studs. While FIG. 9 shows four radial slots, it is to be understood that the number of radial slots will depend upon the number of "L" shaped tabs or studs carried by the retainer ring.

Optionally, as disclosed in co-pending application Ser. No. 08/048,567 filed Apr. 15, 1993 and assigned to the assignee of the present invention, the module housing can be provided with undersized second holes 26, as shown in FIG. 9, which grip the walls of the fasteners 20. Notches 50 cut radially outward around the circumference of the openings 26 reduce the circumferential strength at the opening thus permitting the edges of the hole 26 to deform and engage the wall of the fastener when the module housing is pressed in place. Thus the bag is held firmly between the annular retainer and the module housing during assembly of the remainder of the module assembly without the need for further closure means such as nuts 32 or the like. Circumferential strength of the edges of the openings 26 can also be reduced by beveling or tapering the metal around the periphery of the opening 26.

Fasteners 20 are inserted from the wall side of the annular retainer 16 through first holes 22. Rivets or bolts can be used with clinch fit bolts pressed into place in the annular retainer 16 being preferred. The annular retainer 16 is then inserted through the gas inlet opening in the air bag 12 with the wall side of the retainer ring 16 facing inwardly of the bag. The fasteners 20 are inserted through the fastener holes 24 that are provided in the air bag, as shown in FIG. 8. The module housing 18 is then placed over the outside of the air bag gas inlet opening clamping a region of the air bag 12 adjacent to the inner edge thereof. To prevent the escape of gas and to reinforce the bag edge, a sealant or caulking can be applied between the interfacing surfaces.

With the air bag 12 clamped between the annular retainer 16 and the module housing 18 by means of the axial descending tabs or studs 38 the air bag module is assembled without attachment of the inflator 14. The air bag 12 can be folded and the assembly mounted on the air bag module assembly. After the assembly is complete, except for the inflator 14, the inflator 14 is inserted through a central opening in the module housing 18 and secured by attaching nuts 32 or the like. The arrangement clamps an annular portion of the air bag adjacent to the gas inlet opening boundary 48 between the annular retainer 16 and the module housing 18 attaching the clamping assembly to the flange 30 of the inflator 14. In accordance with the invention, this may comprise the final step in the installation of the air bag module assembly. Although the invention has been described in an application in which the inflatable air bag is mounted to a steering wheel, those skilled in the art will understand that the air bag module assembly can be mounted onto the dashboard or some other part of the body of the vehicle.

In the operation of the air bag restraint system, the impact upon a crash or collision is detected by a sensor (not shown) which ignites gas generant provided in the inflator 14. The inflator 14 discharges inflating gas into the air bag 12 to effect rapid inflation thereof, breaking away a cover (not shown) so that the air bag can expand over the region between the steering wheel and the driver of the vehicle and thus absorb the impact on the latter. At this time the clamped portion of the air bag 12 is subjected to high radial forces which tend to pull the air bag 12 from the mounted position thereof. However, the shear stress of the air bag fabric in the area appurtenant to the fourth holes 24 and the fifth holes 44 act in opposition to those forces and retains the air bag 12 firmly in place, thus preventing gas leakage and assuring the protection of the driver.

With this description of the invention in detail, those skilled in the art will appreciate that modifications may be made to the invention without departing from the spirit thereof. Therefore, it is not intended that the scope of the invention be limited to the specific embodiments that have been illustrated and described. Rather, it is intended that the scope to the invention be determined by the scope of the appended claims.

What is claimed is:

1. An annular retainer ring for holding an air bag cushion onto an air bag inflator housing consisting of:

an annular ring having an inner boundary, a body with a top and bottom, an outer boundary, a plurality of holes passing through the body of the ring and a plurality of axial descending members integral to and projecting away from the bottom of said ring, at least some of said axial descending members consisting of a first leg portion extending perpendicular to the radii of the annular ring and terminating in a second leg portion bent over at an angle with respect to said first leg portion said second leg portion extending circumferentially to the axis of said ring.

2. An annular retainer ring defined in claim 1 wherein all the axial descending members terminate in bent over leg portions.

3. A system for clamping an air bag cushion to an air bag inflator housing comprising:

an annular retainer ring, an air bag module housing and an air bag cushion disposed between said ring and housing, the air bag cushion and housing having a plurality of corresponding through apertures therein, said retainer ring having a plurality of preformed L shaped axial descending members for insertion into said apertures which are shaped in the form of slots to allow said members to pass there through, and at least some of the axial descending members consist of a first leg portion extending from the bottom of said ring and perpendicular to the radii of said ring and terminating in a second leg portion bent over at an angle with respect to said first leg portion, the second leg portion extending circumferentially to the axis of said ring and being shaped so as to engage the housing upon rotation of the ring or housing to lock the ring in place and thusly clamp the ring, air bag cushion and housing together.

4. The air bag mounting system defined in claim 3 wherein all the axial descending members terminate in bent over second leg portions.

5. A system for clamping an air bag cushion to an air bag inflator housing comprising:

an annular retainer ring, an air bag module housing and an air bag cushion disposed intermediate said ring and housing, said air bag cushion and housing having a plurality of corresponding through apertures therein, said retainer ring having a plurality of preformed L shaped axial descending members for insertion into said apertures, and at least some of said L shaped axial descending members consist of a first leg portion extending from the bottom of said ring and perpendicular to the radii of said ring and terminating in a second leg portion bent over at an angle with respect to said first leg portion, the second leg portion being shaped so as to engage the housing upon rotation of the ring or housing to lock the ring in place and thusly clamp the ring, air bag cushion and housing together, said apertures in said housing for receiving said L shaped members are in the form of tapered radial slots which accept said L shaped members and upon rotation of said retainer ring or housing provide a locking action which prevents said ring, cushion and housing assembly from coming apart.

6. The air bag mounting system defined in claim 5 wherein all the axial descending members terminate in bent over second leg portions.

* * * * *